(12) United States Patent
Ku et al.

(10) Patent No.: US 8,308,321 B2
(45) Date of Patent: Nov. 13, 2012

(54) LED UNIT

(75) Inventors: Chin-Long Ku, Taipei Hsien (TW); Wen-Jun Duan, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 323 days.

(21) Appl. No.: 12/788,312

(22) Filed: May 27, 2010

(65) Prior Publication Data

US 2011/0122632 A1    May 26, 2011

(30) Foreign Application Priority Data

Nov. 23, 2009  (CN) .......................... 2009 1 0310200

(51) Int. Cl.
*F21V 3/00* (2006.01)
(52) U.S. Cl. .................................................. 362/311.02
(58) Field of Classification Search ............. 362/311.02, 362/255–256, 555
See application file for complete search history.

(56) References Cited

U.S. PATENT DOCUMENTS

| | | | | |
|---|---|---|---|---|
| 7,618,160 B2* | 11/2009 | Chinniah et al. | ............. | 362/326 |
| 2005/0201118 A1* | 9/2005 | Godo | ............................ | 362/555 |
| 2010/0020547 A1* | 1/2010 | Olsson | ...................... | 362/311.02 |

* cited by examiner

*Primary Examiner* — Anh Mai
*Assistant Examiner* — Brenitra M Lee
(74) *Attorney, Agent, or Firm* — Altis Law Group, Inc.

(57) ABSTRACT

An LED unit includes an LED having an optical axis and a lens mounted on the LED. The lens includes an incidence surface, an emission surface, and a light-reflecting face between the incidence surface and the emission surface. The light-reflecting face has a diameter gradually increasing from a bottom towards a top of the lens. The incidence surface includes a first incidence surface and a second incidence surface extending downwardly from a circumference of the first incidence surface and protruding inwardly towards the LED. Light emitted from the LED with a large angle is refracted by the second incidence surface into substantially parallel beams in one side of a cross-section of the lens through the optical axis of the LED, and the parallel beams are sequentially reflected by the light-reflecting face and refracted by the emission surface out of the lens in substantially parallel beams.

13 Claims, 3 Drawing Sheets

LED UNIT

BACKGROUND

1. Technical Field

The disclosure relates to light emitting devices and, more particularly, to a light emitting diode (LED) unit having a lens which can produce an effectively converged light beam.

2. Description of Related Art

LEDs, available since the early 1960's and because of their high light-emitting efficiency, have been increasingly used in a variety of occasions, such as residential, traffic, commercial, and industrial occasions. Conventionally, light directly output from the LED does not have a desirable pattern; therefore, a light-adjusting element, such as a lens, is used with the LED to adjust the light pattern thereof.

However, a typical lens generally has a limited light-converging capability; that is, the light passing through the lens cannot be effectively converged to have a small light-emission angle. Thus, the light pattern output from the lens may have a yellow annulus or shining annulus appearing at a periphery thereof, adversely affecting illumination effect of the LED.

What is needed, therefore, is an LED unit which can overcome the limitations described above.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure.

Moreover, in the drawings, like reference numerals designate corresponding parts throughout the several views.

DETAILED DESCRIPTION

Figure 1:
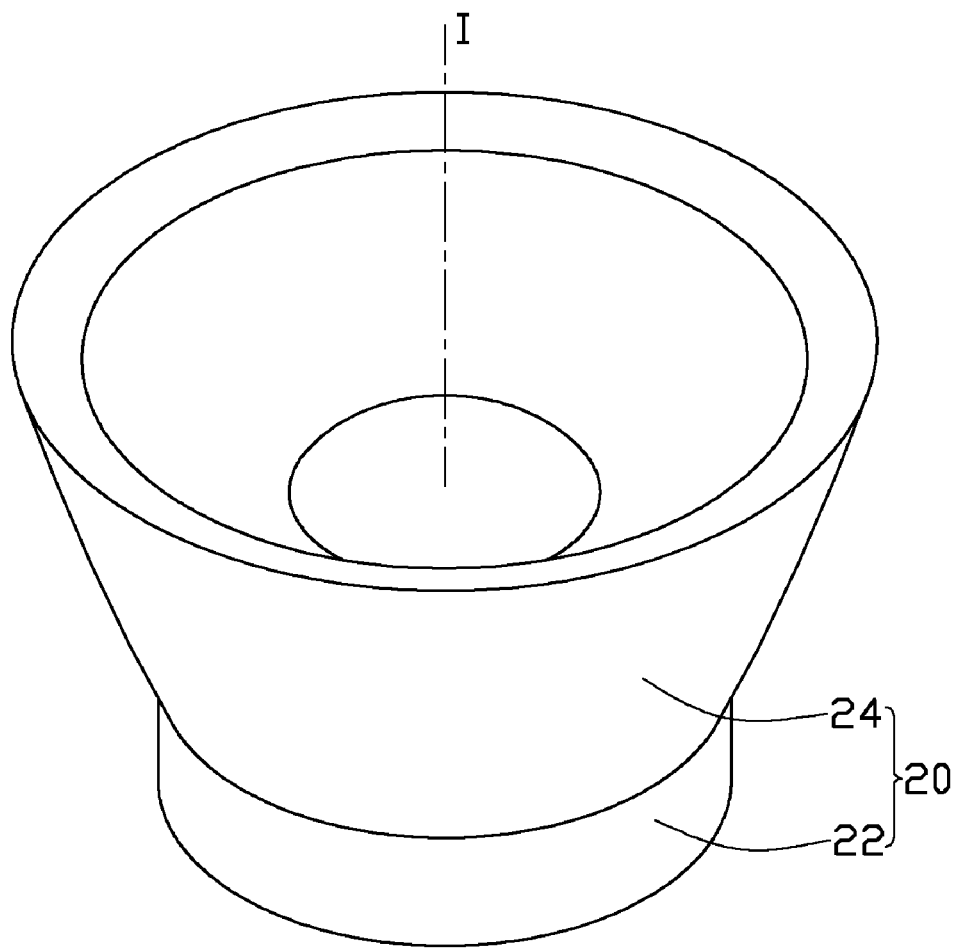
FIG. 1 is an isometric view of a lens of an LED unit in accordance with an embodiment of the disclosure.
Figure 2:
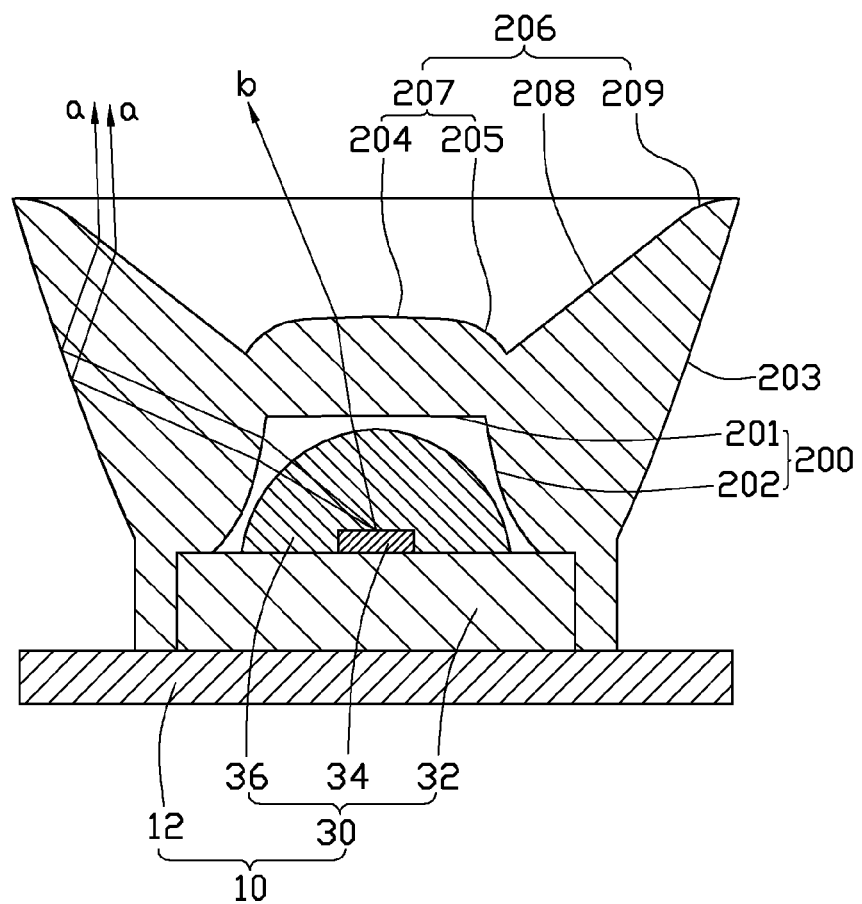
FIG. 2 shows a cross-section of the LED unit with the lens of FIG. 1 mounted on an LED module of the LED unit.

Referring to FIGS. 1 and 2, an LED (light emitting diode) unit in accordance with an embodiment of the disclosure is illustrated. The LED unit comprises an LED module 10 and a lens 20 mounted on the LED module 10. The LED module 10 comprises a printed circuit board 12 and an LED 30 mounted on the printed circuit board 12. The printed circuit board 12 may be a MCPCB (Metal Core Printed Circuit Board), a CPCB (Ceramic Printed Circuit Board) or other type PCBs which have good heat dissipation capability. The LED 30 comprises a heat-conducting base 32, an LED die 34 mounted on a top of the heat-conducting base 32, and an encapsulant 36 covering the LED die 34 and fixed on the top of the heat-conducting base 32. The heat-conducting base 32 of the LED 30 is soldered on the printed circuit board 12 to conduct heat generated by the LED die 34 to the printed circuit board 12. In addition, the LED die 34 is electrically connected with the printed circuit board 12 via the heat-conducting base 32. The LED die 34 may be an InGaN chip or an InGaAs chip. The encapsulant 36 is made of epoxy, silicon, glass or other transparent materials which have good light-permeable and water-proof capabilities. Phosphor, often in the form of particulates, may be doped within the encapsulant 36 to adjust the color of the light emitted from the LED die 34. The encapsulant 36 is shaped like a dome so as to collimate the light emitted from the LED die 34 into a converged beam. The encapsulant 36 is spaced from the lens 20 by air. The LED 30 has an optical axis I, around which the light emitted from the encapsulant 36 is symmetrical in a surrounding space.

Figure 3:
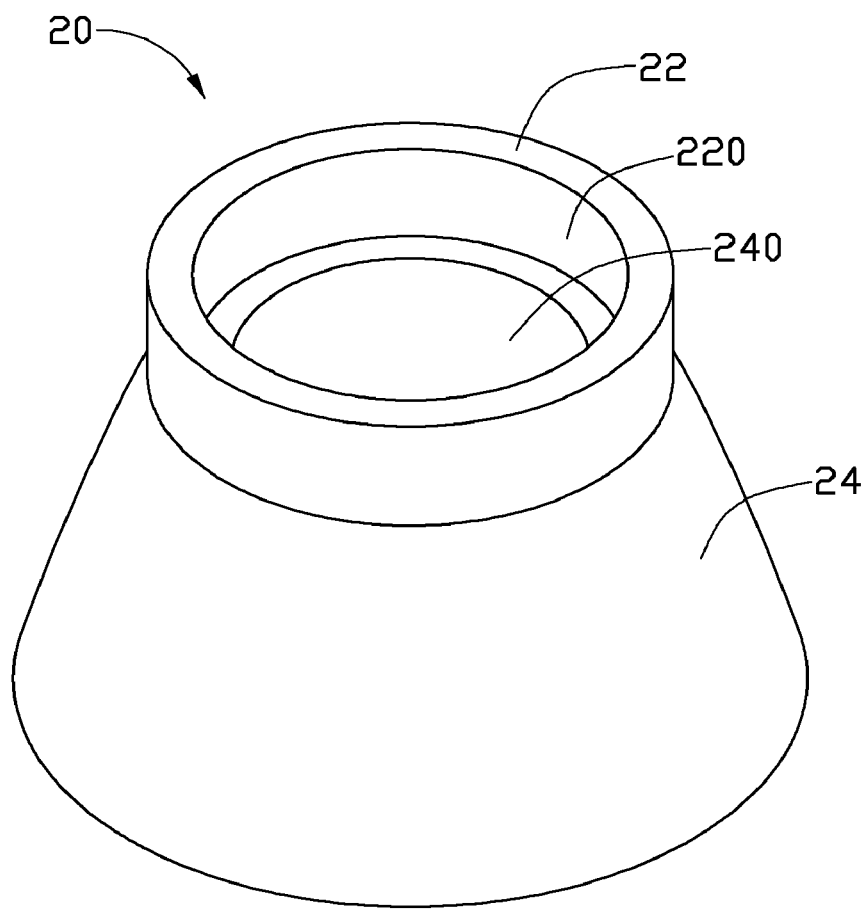
FIG. 3 is an inverted view of the lens of FIG. 1.

Referring also to FIG. 3, the lens 20 is made of transparent material such as PC (polycarbonate) or PMMA (polymethyl methacrylate). The lens 20 comprises a pedestal 22 and an optical member 24 extending upwardly from the pedestal 22. The pedestal 22 contacts the printed circuit board 12 to support the lens 20 on the printed circuit board 12. A kind of glue (not shown) may be smeared on a bottom face of the pedestal 22 to fix the lens 20 on the printed circuit board 12. The pedestal 22 has a circular configuration with a circular window 220 defined in the bottom face thereof. The window 220 has an area similar to that of the base 32 of the LED 30 so that the base 32 of the LED 30 can be engagingly received in the window 220. A cavity 240 is defined in an interior of the lens 20 to form an incidence surface 200. The cavity 240 is located above the center of and communicates with the window 220 to further receive the encapsulant 36 of the LED 30 therein. The cavity 240 has a shape of a truncated cone. A diameter of the cavity 240 gradually decreases from a bottom towards a top of the lens 20.

The incidence surface 200 comprises a flat, horizontal first incidence surface 201 above the encapsulant 36 and a curved second incidence surface 202 extending downwardly from a circumference of the first incident surface 201 and protruding inwardly and downwardly toward the encapsulant 36. In other words, an inner face of the lens 20 facing a central portion of the encapsulant 36 of the LED 30 functions as the first incidence surface 201 of the lens 20 to receive the light emitted from the LED 30 with a small light-emission angle (such as the light b shown in FIG. 2). Another inner surface of the lens 20 surrounding the encapsulant 36 of the LED 30 functions as the second incidence surface 202 of the lens 20 to receive the light emitted from the LED 30 with a large light-emission angle (such as the light a shown in FIG. 2). The first incidence surface 201 is planar, and the second incidence surface 202 is curved and protrudes inwardly towards the LED 30. The second incidence surface 202 has a curvature ranging between 0.05 mm$^{-1}$ and 0.8 mm$^{-1}$. The first and second incidence surfaces 201, 202 cooperatively refract all of the light of the LED 30 into the lens 20.

The optical member 24 has an upwardly-expanding bowl shape. An outer circumference of the optical member 24 functions as a light-reflecting face 203 of the lens 20 to totally reflect the light transferred from the second incidence surface 202 towards the top of the lens 20. Alternatively, the light-reflecting face 203 can be further coated with a reflective layer (such as aluminum layer or silver layer) for promoting light reflection. A diameter of the light-reflecting face 203 of the lens 20 gradually increases from the bottom towards the top of the lens 20. The light-reflecting face 203 has a curvature ranging between 0.01 mm$^{-1}$ and 0.055 mm$^{-1}$. The light-reflecting face 203 has its top edge directly coupled with an emission surface 206, and its bottom edge indirectly connected to the incidence surface 200 via the pedestal 22.

The emission surface 206 comprises a first emission surface 207 at a central portion of a top face of the optical member 24, a second emission surface 208 surrounding the first emission surface 207, and an arc-shaped face 209 connecting the second emission surface 208 and the top edge of the light-reflecting face 203. The top face of the optical member 24 is concaved downwardly to form the second emission surface 208. The second emission surface 208 is a periphery of a conical frustum. The second emission surface 208 has a taper of 95° to 110°. In this embodiment, the second emission surface 208 has a taper of 104°. Alternatively, the second emission surface 208 has a taper of 103°. The arc-shaped face 209 flares upwardly and outwardly from a top edge of the second emission surface 208. A curvature of the arc-shaped face 209 is 1.5 mm$^{-1}$. A protrusion (not labeled) protrudes upwardly from the central portion of the top face of the optical member 24. An outer face of the protrusion forms the first emission surface 207. The first emission surface 207 comprises a substantially flat face 204 lower than the top edge of the light-reflecting face 203 and a curved face 205 downwardly continuous from the flat face 204. The curved face 205 connects the flat face 204 with the second emission surface 208. The curved face 205 has a curvature larger than 0 mm$^{-1}$ and not larger than 1.4 mm$^{-1}$. An area of the flat face 204 of the first emission surface 207 is smaller than that of the first incidence surface 201 of the incidence surface 200.

The first emission surface 207 of the emission surface 206 mainly takes charge for the light transmitted from the first incidence surface 201 of the incidence surface 200, and the second emission surface 208 of the emission surface 206 mainly takes charge for the light totally reflected by the light-reflecting face 203, to thereby refract nearly all of the light from the LED 30 out of the lens 20 within a small light-emission angle.

When the LED unit works, a part of the light emitted from the LED 30 with the large light-emission angle is refracted by the second incidence surface 202 of the incidence surface 200 into substantially parallel beams in one of two opposite sides of a cross-section of the lens 20 through the optical axis I of the LED 30. The parallel beams are totally reflected by the light-reflecting face 203 and then refracted by the second emission surface 208 of the emission surface 206 out of the lens 20 in substantially parallel beams (such as the light a shown in FIG. 2). The other part of the light emitted from the LED 30 with the small light-emission angle is refracted by the first incidence surface 201 of the incidence surface 200 and then is refracted by the first emission surface 207 of the emission surface 206. The light emitted from the LED unit has a peak light intensity. Due to the lens 20, a light-emission angle at 10% of the peak light intensity of the LED unit is ranged between 28-32 degrees.

As being adjusted by the incidence surface 200, the light-reflecting face 203 and the emission surface 206, the light emitted from the LED 30 could be effectively converged within a small angle, thereby preventing a periphery of a light pattern output by the LED 30 via the lens 20 from being yellow or shining.

It is to be understood, however, that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED (light emitting diode) unit comprising:
an LED having an optical axis; and
a lens mounted on the LED, the lens comprising:
an incidence surface adjacent to the LED,
an emission surface remote from the LED, and
a light-reflecting face between the incidence surface and the emission surface, the light-reflecting face having a diameter gradually increasing from a bottom towards a top of the lens,
the incidence surface comprising a first incidence surface confronting the LED and a second incidence surface surrounding the LED and extending downwardly from a circumference of the first incidence surface, the second incidence surface protruding inwardly towards the LED,
the emission surface comprising a first emission surface at a central portion of a top face of the lens and a second emission surface extending upwardly and outwardly from a circumference of the first emission surface, the second emission surface being a periphery of a conical frustum,
wherein light emitted from the LED with a large light-emission angle is refracted by the second incidence surface of the incidence surface into substantially parallel beams in one of two opposite sides of a cross-section of the lens through the optical axis of the LED, and the parallel beams are sequentially reflected by the light-reflecting face and refracted by the emission surface out of the lens in substantially parallel beams.

2. The LED unit of claim 1, wherein a light-emission angle at 10% of a peak light intensity of the LED unit is ranged between 28-32 degrees.

3. The LED unit of claim 1, wherein the second incidence surface of the incidence surface is curved and has a curvature ranging between 0.05 mm$^{-1}$ and 0.8 mm$^{-1}$.

4. The LED unit of claim 1, wherein the first incidence surface of the incidence surface of the lens is flat.

5. The LED unit of claim 1, wherein the light-reflecting face has a curvature ranging between 0.01 mm$^{-1}$ and 0.055 mm$^{-1}$.

6. The LED unit of claim 1, wherein the second emission surface of the emission surface has a taper of 95° to 110°.

7. The LED unit of claim 6, wherein the second emission surface of the emission surface has a taper of 103°.

8. The LED unit of claim 1, wherein the first emission surface of the emission surface is convex away from the LED.

9. The LED unit of claim 1, wherein the emission surface of the lens further comprises an arc-shaped face connecting a top edge of the second emission surface and a top edge of the light-reflecting face.

10. The LED unit of claim 9, wherein a curvature of the arc-shaped face of the emission surface is 1.5 mm$^{-1}$.

11. The LED unit of claim 8, wherein the first emission surface of the emission surface comprises a substantially flat face lower than a top edge of the light-reflecting face and a curved face downwardly continuous from the flat face, the curved face connecting the flat face with the second emission face of the emission surface.

12. The LED unit of claim 11, wherein the curved face of the first emission surface of the lens has a curvature larger than 0 mm$^{-1}$ and not larger than 1.4 mm$^{-1}$.

13. The LED unit of claim 11, wherein an area of the flat face of the first emission surface is smaller than that of the first incidence surface of the incidence surface.

* * * * *